Aug. 22, 1933.  H. L. BONE  1,923,568
CLUTCH DEVICE
Filed Sept. 23, 1932
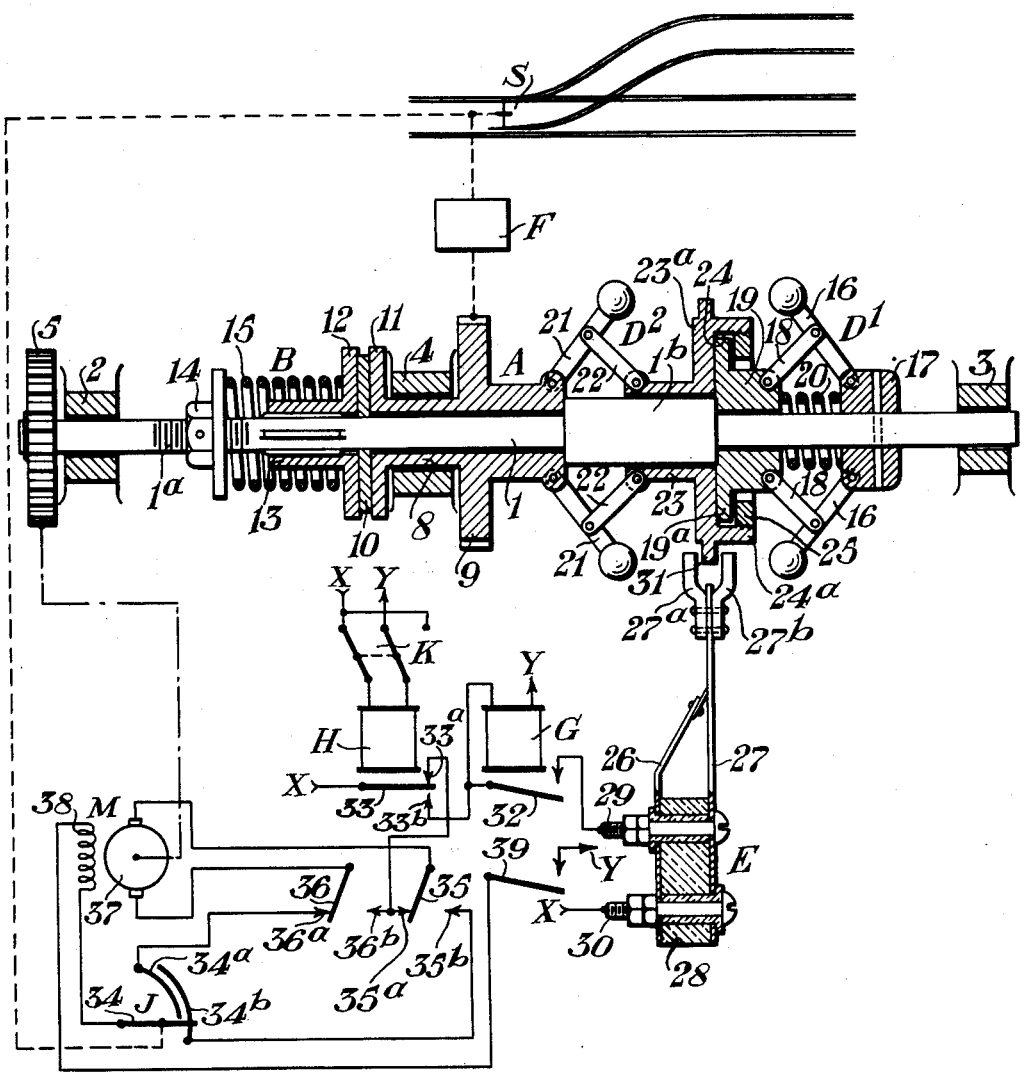
INVENTOR.
Herbert L. Bone
BY  A. R. Tunnell
HIS ATTORNEY.

Patented Aug. 22, 1933

1,923,568

UNITED STATES PATENT OFFICE 1,923,568

CLUTCH DEVICE

Herbert L. Bone, Swissvale, Pa., assignor to The Union Switch & Signal Company, Swissvale, Pa., a Corporation of Pennsylvania Application September 23, 1932
Serial No. 634,519

4 Claims. (Cl. 192—150)

My invention relates to clutch devices.

In power operated switch and lock movements, that is, in power operated mechanisms for unlocking the movable points of a railway switch, reversing them, and then relocking them in their reverse position, a friction clutch is usually provided between the motor device and the operating mechanism to eliminate shocks to the operating mechanism caused by the inertia of the motor device at the time the switch points come to rest after they have been reversed, and also to protect the operating mechanism against damage in case the operating mechanism is stalled while the power is still being applied to the motor, as sometimes happens when the switch points are prevented from moving to an extreme position by an obstruction such as a lump of coal, ice, etc. For eliminating shock after the switch points have been reversed during normal operation, it is desirable that the clutch be adjusted to slip at as low a torque as possible, but, in order to take full advantage of the power of the motor device during the power stroke of the movement, it is necessary to adjust the clutch to slip at a torque which is high enough to transmit the full power of the motor device. Furthermore, in the event that the power device is an electric motor which is to be protected by the usual excess current relay, it is necessary to adjust the clutch to slip at a torque which is still higher than that necessary to transmit the full power of the motor because the characteristics of friction clutches are such that after they have once started to slip, they transmit less torque, and therefore cause the motor to draw less current, than at the instant before slippage occurs. If the clutch is set so that the motor will draw enough current to trip the excess current relay when the clutch is slipping, the motor will become unnecessarily overloaded before slippage occurs, and in addition, the clutch will be of very little value in preventing shock to the switch mechanism caused by the inertia of the motor at the end of the mechanism travel. One object of my invention is to provide novel means whereby, as soon as the clutch starts to slip, the power device will be automatically cut off irrespective of the motor current thus permitting the clutch to be set to slip at a torque which is just equal to the normal allowable working load on the motor without any danger of damaging the motor, and at the same time causing the clutch to function more satisfactorily as a means of eliminating shock at the end of the mechanism travel in either direction than would otherwise be possible.

I will describe one form of clutch device embodying my invention, and will then point out the novel features thereof in claims.

The accompanying drawing is a view, partly sectioned and partly diagrammatic, showing one form of clutch device embodying my invention applied to apparatus for operating a railway switch.

Referring to the drawing, the device comprises a rotatable shaft 1 which may be driven by any suitable power device, and which, in turn, drives a gear assembly A through the medium of a friction clutch B. The shaft 1 is journalled in suitable bearings 2, 3 and 4, and as here shown, is driven by an electric motor M which is connected with the shaft by suitable gearing including a gear wheel 5 fixed to the left-hand end of the shaft.

The gear assembly A, in the form here illustrated, comprises a gear wheel 9 secured to a sleeve 8 which is held in a fixed longitudinal position on the shaft 1 by means of the bearing 4, but which is free to rotate both with respect to the shaft and to the bearing. The gear wheel 9 may be connected with any suitable load through any suitable connecting means, but since my invention is particularly useful in connection with railway switch operating mechanisms, I have here shown the gear wheel 9 connected with a railway switch S through the medium of a switch operating mechanism indicated diagrammatically in the drawing at F. The detailed construction of the mechanism F is not shown in the drawing because it forms no part of my present invention. This mechanism may, however, be similar to that shown in Letters Patent of the United States No. 1293290, granted to William Zabel on February 4, 1919, for Railway traffic controlling apparatus, in which event the gear wheel 9 will be operatively connected with the shaft 40 of the operating mechanism in such manner that rotation of the gear wheel 9 will cause corresponding rotation of the shaft 40.

The friction clutch B, as here shown, comprises a friction disk 10 interposed between a clutch plate 11 which is secured to the left-hand end of the sleeve 8, and a clutch plate 12 which is secured to the right-hand end of a sleeve 13. This latter sleeve is splined to the shaft 1 so that it is free to slide along the shaft but is constrained to rotate with the shaft. Interposed between the clutch plate 12 and a flange nut 14 screwed on a threaded portion 1ª of the shaft 1 is a spring 15 which biases the clutch plate 12 to the position in which the clutch plates 11 and 12 and the friction disk 10 are held in close contact. It will be readily understood that by varying the position of the nut 14 on the shaft 1, the tension of the spring 15 may be varied, thus permitting the torque which the clutch B will transmit to be varied. The tension of the spring 15 will usually be so adjusted that the clutch B will not slip so long as the load on the gear wheel 2 is within the normal working load of the motor M, but that, as soon as the gear wheel 2 exceeds the normal working load of the motor, the clutch B will start to slip.

The clutch device also comprises two oppositely arranged centrifuges $D^1$ and $D^2$ which are mounted on the shaft 1, and which are connected respectively to the shaft and to the gear assembly A. Referring first to the centrifuge $D^1$, this centrifuge comprises two weighted centrifuge arms 16 each pivotally attached at its unweighted end to a collar 17 pinned to the shaft 1, and each pivotally connected intermediate its ends, by means of a link 18, with a collar 19 which is slidably mounted on the shaft 1. The collar 19 is biased, by means of a spring 20 interposed between this collar and the collar 17, to the position in which it engages a shoulder formed by an enlarged portion $1^b$ of the shaft 1, so that, at any time when the shaft is at rest the collar 19 will be returned to the position shown, which is its normal position.

The centrifuge $D^2$ is similar to the centrifuge $D^1$ and comprises a pair of weighted centrifuge arms 22 pivotally connected at their unweighted ends to the sleeve 6, and connected intermediate their ends by means of links 22 with an elongated collar 23 which is mounted to both slide and rotate on the enlarged portion $1^b$ of the shaft 1. The parts of the two centrifuges $D^1$ and $D^2$ are so proportioned that when the clutch B is not slipping so that the centrifuge $D^2$ is rotated at the same speed as the centrifuge $D^1$, the centrifuge $D^2$ will exert the same force on the collar 23 tending to move this collar toward the left on the shaft 1, as the centrifuge $D^1$ exerts on the collar 19 tending to move this collar toward the right on the shaft 1.

The two centrifuges $D^1$ and $D^2$ are connected together in a manner which I will now describe, and are arranged to control a contact E in such manner that as long as the speed of the gear assembly A is the same as the speed of the shaft 1, the contact E will remain closed, but that, if the speed of the gear assembly A decreases below that of the shaft 1 due to the clutch B slipping, the contact E will become opened. As here shown, the means for connecting the two centrifuges together comprises a circumferential flange formed on the collar 19, and fitting with some clearance within a recess 24 formed by a laterally extending flange $24^a$ provided on the collar 23, the flange 19 being loosely held within the recess 24 by means of a ring member 25 which is screwed into the outer end of the recess 24. With this construction, it will be seen that the collars 19 and 23 are free to rotate independently of each other, but that longitudinal movements of either collar will cause corresponding longitudinal movements of the other collar. It follows, therefore, that if clutch B slips so that the speed of the gear assembly A decreases below that of the shaft 1, thus causing the centrifuge $D^1$ to exert a greater force on the collar 19 than is exerted on the collar 23 by the centrifuge $D^2$, the collars 19 and 23 will move as a unit toward the right on the shaft 1.

The contact E comprises a fixed contact finger 26 and a flexible contact finger 27 secured to the opposite sides of a fixed insulating support 28 by means of two terminal posts 29 and 30. The terminal post 29 is electrically connected with the finger 27 but is insulated from the finger 26, while the terminal post 30 is electrically connected with the finger 26, but is insulated from the finger 27. The flexible finger 27 is provided with an initial tension which biases this finger to the position in which the contact E is closed. Attached to the upper end of the finger 27 are two insulating members $27^a$ and $27^b$ which form a yoke which receive with some clearance a circumferential rib 31 formed on the enlarged portion $23^a$ of the collar 23. The parts are so proportioned that when the collars 19 and 23 occupy their normal positions, the finger 27 will remain in engagement with the finger 26, due to its bias, so that the contact E will then be closed, but that, if the collar 23 is moved toward the right, as is the case when the clutch B slips, the finger 27 will then be moved toward the right, thus opening contact E.

It should be pointed out that since the spring 20 normally holds the collar 19 in the position in which it engages the shoulder formed at the right-hand end of the enlarged portion $1^b$ of the shaft 1 with a certain initial force, by properly proportioning this spring, the contact E may be made to become opened at any desired rate of slipping of the friction clutch B.

The contact E may be used to control the motor M in any suitable manner which will prevent damage to the motor in the event that the motor becomes overloaded and causes the clutch B to slip. As here shown, the contact E is included in a stick circuit for an overload relay G which controls the motor M jointly with a circuit controller J and a polarized relay H. The stick circuit for relay G including contact E passes from terminal X of a suitable source of current, not shown in the drawing, through contact E, a front contact 32 of relay G, and the winding of relay G to the other terminal Y of the source. Relay G is also provided with a pick-up circuit which passes from terminal X through back contact $33$—$33^b$ of relay H, and the winding of relay G to terminal Y. It will be seen, therefore, that relay G will always be energized when relay H is deenergized, and that, when relay H is energized, relay G will then also be energized provided its stick circuit is not interrupted at contact E subsequent to the energization of relay H.

The circuit controller J is controlled in accordance with the position of the switch S, and comprises a contact 34—$34^a$ which is closed at all times except when the switch occupies its extreme normal position in which position it is shown in the drawing, and a contact 34—$34^b$ which is closed at all times except when the switch occupies its extreme reverse position.

The polar relay H is arranged to be supplied with current of normal or reverse polarity from the terminals X and Y according as the contacts of a pole-changer K occupy their normal positions in which they are shown in the drawing, or their reverse positions. When relay H is supplied with current of normal polarity, its polar contacts 35 and 36 are swung toward the left as shown, but when the relay is supplied with current of reverse polarity, its polar contacts are then swung toward the right.

As shown in the drawing, relay H is energized in its normal direction, and relay G is deenergized, contact E and contact 34—34$^b$ of circuit controller J are both closed, while contact 34—34$^a$ of circuit controller J is open. Motor M is deenergized and shaft 1 is at rest. Switch S occupies its normal extreme position.

In explaining the operation of the apparatus as a whole, I will assume that it is desired to reverse the switch S. To do this, pole-changer K is moved from its normal to its reverse position, thus reversing the polarity of the current supplied to relay H. During the movement of the pole-changer K from its normal to its reverse position relay H becomes momentarily deenergized, and as a result, front contact 33—33$^a$ of relay H then becomes opened, and back contact 33—33$^b$ becomes closed. When back contact 33—33$^b$ becomes closed, the pick-up circuit for relay G becomes closed and relay G becomes energized, thus insuring that when relay H becomes energized in the reverse direction, relay G will then be energized over its stick circuit. As soon as the polar contacts of relay H reach their reverse positions, and front contact 33—33$^a$ again becomes closed, the reverse energizing circuit for motor M becomes completed, and current flows from terminal X through front contact 33—33$^a$ of relay H, reverse contact 36—36$^b$ of relay H, armature 37 of motor M, reverse contact 35—35$^b$ of relay H, contact 34—34$^b$ of circuit controller J, field winding 38 of motor M, and front contact 39 of relay G to terminal Y. This current flowing in the motor circuit energizes motor M, and the motor therefore operates, through the medium of gear wheel 5, clutch B, driving gear assembly A and switch operating mechanism F, to move the switch to its reverse position. When the switch reaches its full reverse position, contact 34—34$^b$ of circuit controller J opens and deenergizes the motor. When this happens, since the switch points are then in their full reverse position, further rotation of the gear assembly A is prevented, and the clutch B therefore slips allowing the inertia of the motor to be dissipated without damaging the switch operating mechanism. When the clutch B slips, contact E becomes opened and interrupts the stick circuit for relay G so that relay G becomes deenergized.

When it is desired to subsequently restore the switch to its normal position, pole-changer K is restored to its normal position. During the movement of pole-changer K to its normal position relay H again becomes momentarily deenergized and completes the pick-up circuit for relay G in the same manner as when pole-changer K was being moved from its normal to its reverse position. As soon as relay G becomes energized, its stick circuit is then completed at its front contact 32, and relay G therefore remains energized after back contact 33—33$^b$ of relay H opens. As soon as the normal contacts and the front contacts 33—33$^a$ of relay H become closed, the normal energizing circuit for motor M becomes closed, and current then flows from terminal X through front contact 33—33$^a$ of relay H, normal contact 35—35$^a$ of relay H, armature 37 of motor M, normal contact 36—36$^a$ of relay H, contact 34— 34$^a$ of circuit controller J, winding 38 of motor M, and contact 39 to terminal Y. It will be noted that this current flowing in the motor circuit flows through the motor field in the same direction as when the switch was being moved to its reverse position, but that the direction of flow of the current in the motor armature is now reversed, so that the motor now operates to restore the switch to its normal position. When the switch reaches its full normal position contact 34—34$^a$ of circuit controller J opens and deenergizes the motor. Clutch B now again slips and causes contact E to become opened thus deenergizing relay G. All parts are then restored to their normal positions in which they are shown in the drawing.

If during the movement of the switch to either its normal or its reverse position an obstruction occurs which prevents the movement of the switch from becoming completed, clutch B will slip and contact E will become opened, thus deenergizing relay G. The deenergization of relay G will interrupt the motor circuit at front contact 39 of this relay, and the motor will therefore become deenergized. As soon as shaft 1 stops rotating, contact E will again become closed, but relay E will remain deenergized until pole-changer E is reversed to energize relay H in the opposite direction from that in which it was energized when the obstruction occurred.

It will be readily understood that in the event that it is desired to operate the shaft 1 by some form of motor device other than electric motor, such for example, as a fluid pressure motor, the contact E may be replaced by any suitable device for cutting off the supply of power to the fluid pressure motor when the clutch B starts to slip.

Although I have herein shown and described only one form of clutch devices embodying my invention, it is understood that various changes and modifications may be made therein within the scope of the appended claims without departing from the spirit and scope of my invention.

Having thus described my invention, what I claim is:

1. In combination, a drive shaft, a sleeve mounted to rotate on said shaft and connected with the shaft by means of a friction clutch, a gear secured to said sleeve for transmitting power from said shaft, a first centrifuge operatively connected with said gear, a second centrifuge secured to said shaft, a contact, and means controlled jointly by said two centrifuges for controlling said contact.

2. In combination, a drive shaft, a first sleeve rotatably mounted on said shaft in a fixed position, a first clutch plate secured to one end of said first sleeve, a second sleeve splined to said shaft adjacent said first sleeve and provided with a second clutch plate which faces said first clutch plate, a friction disk on said shaft between said two clutch plates, a spring on said shaft for biasing said first sleeve to the position in which said two clutch plates and said friction disk are firmly held together, a gear for transmitting power from said shaft secured to said first sleeve, a first centrifuge responsive to the speed of rotation of said gear, a second centrifuge responsive to the speed of rotation of said shaft and arranged to act in opposition to said first centrifuge, said two centrifuges being so designed that when said gear and said shaft are rotating at the same speed the forces exerted of said second centrifuge will be equal and opposite to the force exerted by said first centrifuge and a contact controlled by said two centrifuges in such manner that said contact will be operated if the force exerted by said second centrifuge exceeds that exerted by said first centrifuge.

3. In combination, a rotatable shaft, a power shaft connected with said shaft for rotating said shaft, a gear connected with said shaft by means of a friction clutch, a first centrifuge responsive to the speed of rotation of said shaft, a second centrifuge responsive to the speed of rotation of said gear and arranged to act in opposition to said first centrifuge, said two centrifuges being so designed that when they are rotated at the same speed they will exert equal forces, and means for controlling said power means controlled by said two centrifuges.

4. In combination, a drive shaft, a first sleeve rotatably mounted on said shaft and connected with the shaft by means of a friction clutch, a member secured to said sleeve for transmitting power to a load, a first centrifuge comprising a pair of centrifuge arms pivotally attached to said sleeve and connected by means of links with a first collar slidably and rotatably mounted on said shaft, said first collar being provided at one end with an enlarged portion having a recess formed therein, a second centrifuge comprising a pair of centrifuge arms pivotally attached to a second collar secured to said shaft and connected by means of links with a third collar slidably mounted on said shaft, a spring interposed between said second and third collars for biasing said third collar to one position, a circumferential flange on said second collar fitting within the recess in said first collar in such manner that said two collars are free to rotate relative to each other, a ring member screwed into the recess in said first collar and arranged to cooperate with said flange in such manner that axial movements of said third collar will cause corresponding axial movements of said first collar, and a contact responsive to axial movements of said first collar.

HERBERT L. BONE.